United States Patent [19]
Piat

[11] Patent Number: 5,842,236
[45] Date of Patent: Dec. 1, 1998

[54] DEVICE FOR REFILLING AND EMPTYING LAVATORY FLUSHING CISTERNS

[75] Inventor: Moïse Piat, Nice, France

[73] Assignees: Jean Videau, Rep. of Korea; Laurent Videau, Thailand

[21] Appl. No.: 586,911
[22] PCT Filed: Feb. 3, 1995
[86] PCT No.: PCT/FR95/00136
  § 371 Date: Mar. 28, 1996
  § 102(e) Date: Mar. 28, 1996
[87] PCT Pub. No.: WO95/33102
  PCT Pub. Date: Dec. 7, 1995

[30] Foreign Application Priority Data

May 26, 1994 [FR] France .................................. 94 06651
Sep. 7, 1994 [FR] France .................................. 94 10933
Sep. 7, 1994 [FR] France .................................. 94 10934

[51] Int. Cl.⁶ ...................................................... E03D 1/36
[52] U.S. Cl. ..................................................... 4/366; 4/325
[58] Field of Search ............................... 4/324, 325, 366, 4/333

[56] References Cited

U.S. PATENT DOCUMENTS 4,882,793  11/1989  Thompson .................................. 4/324

FOREIGN PATENT DOCUMENTS

2676480 A1  11/1992  France .
2412780 A1   9/1975  Germany .
2856242 A1   7/1980  Germany .
   2179074   2/1987  United Kingdom .
WO 85/03964  9/1985  WIPO .

Primary Examiner—Charles E. Phillips
Attorney, Agent, or Firm—Adduci, Mastriani & Schaumberg, L.L.P.

[57] ABSTRACT

Device for a lavatory cistern including: a) a flush valve opened by the lowering of a horizontal cam (13) pushing on a horizontal valve (11) which separates a ball (10) from its sealing seat; and b) a dual flushing volume mechanism, with an emptying tube (25) carrying a base floater (31), an intermediate floater (32) and, at its upper portion, a horizontal projecting element (33) which is optionally locked in its ascending stroke according to whether a weak or heavy flushing is selected.

14 Claims, 4 Drawing Sheets

DEVICE FOR REFILLING AND EMPTYING LAVATORY FLUSHING CISTERNS

The invention relates to a device for refilling and emptying lavatory flushing cisterns of the type which allows the user to choose either a weak or heavy flush.

BACKGROUND OF THE INVENTION

It is also of the type in which the flush valve and mechanism co-operate to form a homogeneous unit, the various parts of which are housed inside an inner tank.

The latter principle is known particularly from European Patent No. 01722778 A 3, but in the case of the present invention, the overflow device comprises arrangements which, when flushed, are aimed at providing a guide to prevent the water from being forced back into the lavatory cistern.

BRIEF DESCRIPTION OF THE DRAWINGS

To understand the invention fully, reference is made to the attached non-limiting drawings.

DETAILED DESCRIPTION OF THE PREFERRED EMBODIMENTS

Figure 1:
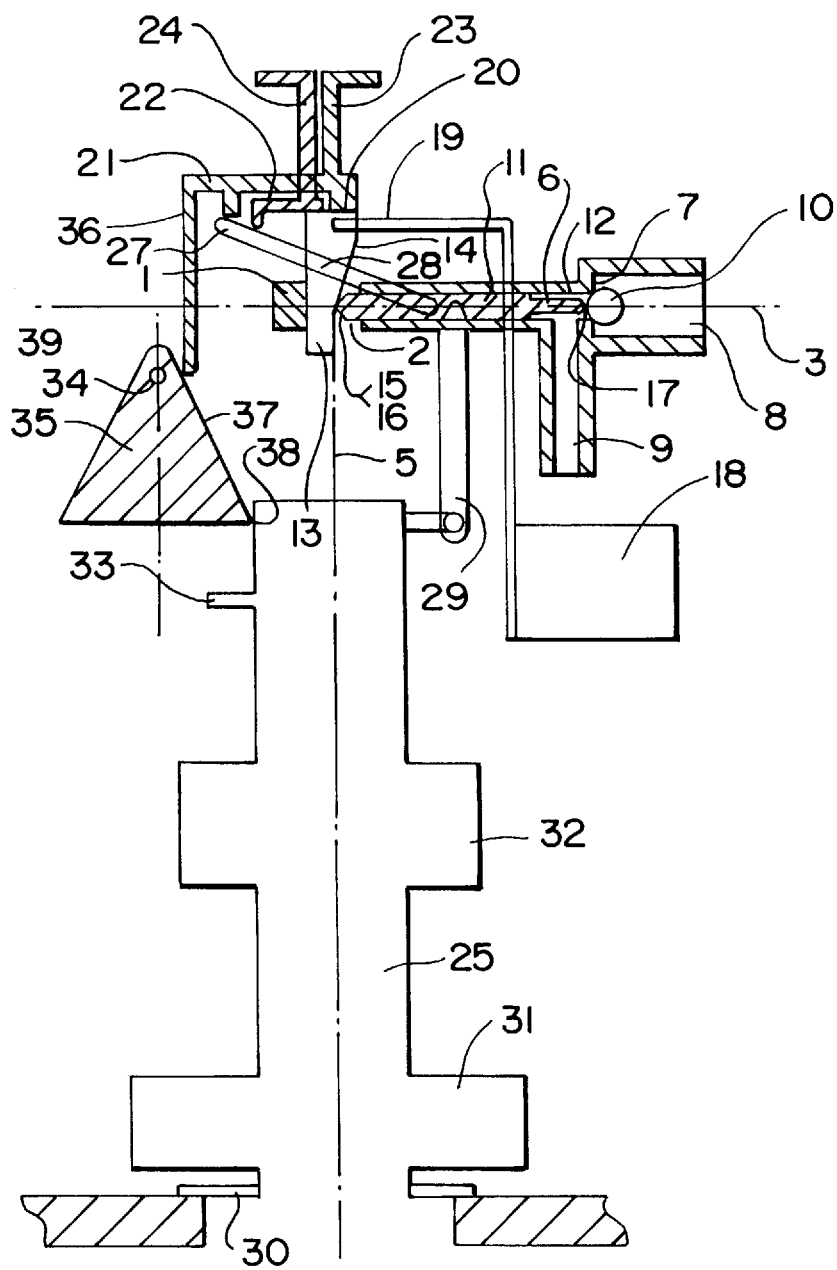
FIGS. 1, 2 and 3 are longitudinal sections which show the different phases of flush operation, i.e.:
1. the position when not in use, with the cistern filled
2. the open position for a weak flush
3. the open position for a heavy flush

The body of the flush valve along comprises a parallelepiped-shaped element (1) arranged horizontally which comprises a rectangular-section opening (2). The longitudinal axis (3) of the element (1) is perpendicular to the axis (5) of the opening (2).

On one side of the opening (2) along the axis (3) a horizontal cylindrical tube (6) is arranged which, on one side, discharges into the opening (2) and, on the other, comprises a shoulder (7) of greater diameter than that of (6) and which is extended by a cylindrical compartment (8) into which water enters under pressure.

A downward-directed open vertical tube (9) guided downwards is connected to the tube (6) in the proximity of (7).

A ball (10) of greater diameter than that of (6) is placed inside the compartment (8) in such a way that, under the effect of pressure, the ball abuts the shoulder (7) so as to be sealing-tight.

A valve (11) slides inside (6) and, on the side of (7), carries a nipple (12) of lesser diameter than that of (11).

A cam (13) slides vertically inside the opening (2) and comprises a ramp (14). The cam (13) is made rigid with a floater (18) by any means, such as for example a rod (19) arranged at right angles;

The unit is arranged in such a way that when the flush valve is in the closed position:
a) The base (15) of the ramp (14) is in contact with the end (16) of the valve (11).
b) The end (17) of the nipple (12) is in contact with the ball (10) abutting its seat (7).

Two horizontal elements (21) and (22) bear upon the upper horizontal side (20) of the cam (13), on the top of which elements vertical rods (23) and (24) are secured.

The elements (21) and (22) co-operate with any device for lifting the overflow tube (25), the said device may for example comprise a fork (27) which, by pivoting about a horizontal axis (28) moves a rocker bar (29), the unit being arranged in such a way that the tube (25) is lifted irrespective of which control rod is used.

The tube (25) which carries the emptying valve (30) at its base also carries, at its lower portion, a floater (31), then at its intermediate portion, a floater (32) and lastly, at its upper portion a horizontal projecting element (33).

An element (35) pivots freely about an axis (34) parallel to (28), whereas below either one of the control elements, for example (21) and rod (36) is fastened, the element (35) and the rod (36) being in the same vertical plane.

The element (35) is arranged and suspended in such a way that, in the normal gravity position, one of its sides comprises an inclined ramp (37) the lower end (38) of which is located in the vertical lifting space of the element (33).

The rod (36), in turn, then comes into contact with the ramp (37) at its end (39) in such a way that pushing down said rod (36) causes the element (35) to pivot, the end (38) of which exceeds the element (33) lift range.

The device operates as follows, the reference to FIG. 1; the cistern is full:

Pushing down either of the rods (23) or (24) lowers the cam (13) whose ramp (14) shifts the valve (11) which, via at its end (12) separates the ball (10) from its seat (7)

Water then circulates from the compartment (8) to the open tube (9) and fills the tank.

In the final filling phase, the floater (18) is lifted, which returns the cam (13) to its starting position. The valve (11) returns to its position and the ball (10) once again abuts its seat (7) thereby cutting off the flow and closes, the water inlet valve.

Figure 2:
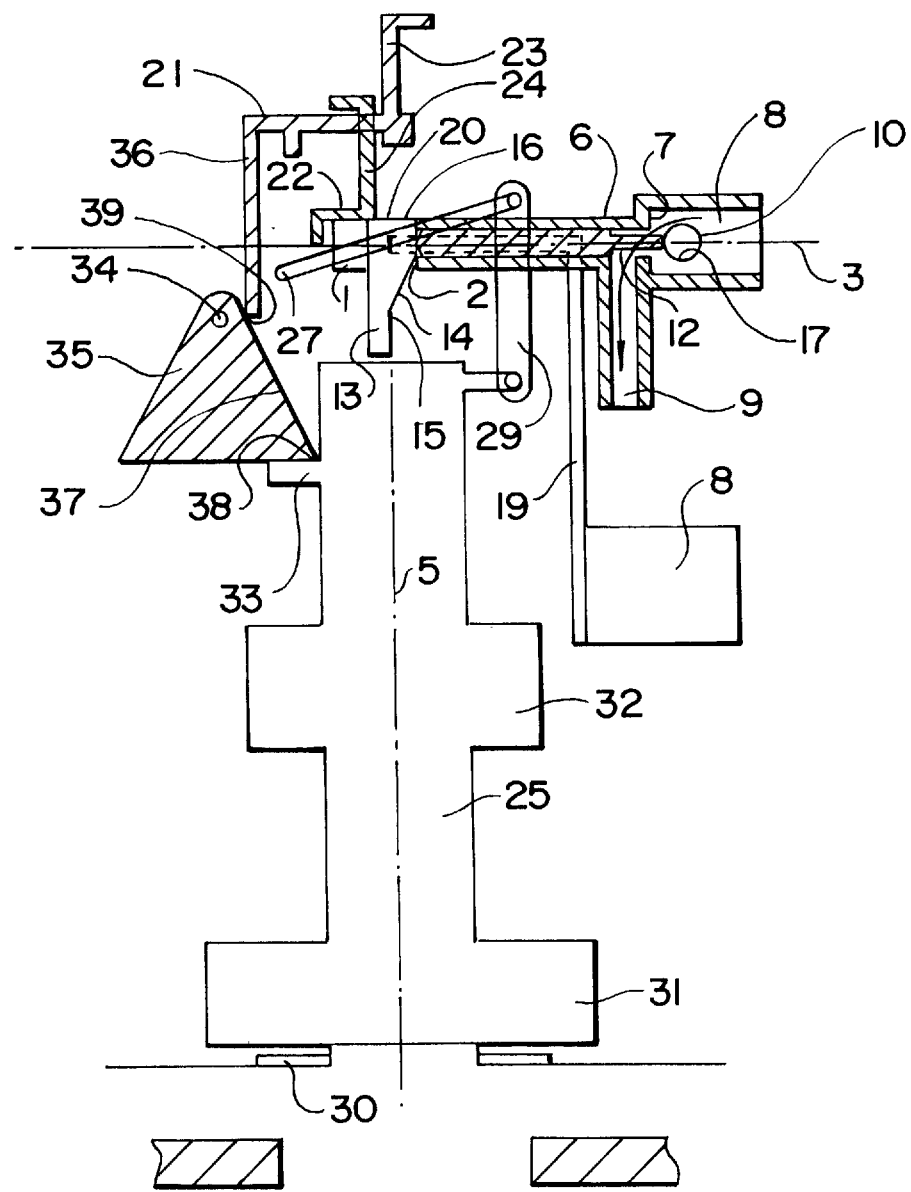

As depicted in FIG. 2, when the flush is triggered by the user by means of the rod (24) the element (21) stays in position with its rod (36), the same applies to the element (35).

The end (38) thus acts as a stop for the projecting element (33).

The lift amplitude thereby obtained corresponds to a situation in which the suction to which it is subjected would cause it to drop back down immediately onto its sealing seat, if the drop were not delayed by the action of the intermediate floater (32).

The latter is sized in such a way that the vertical thrust which it experiences is greater than the suction force exerted on the tube (25) which drops down again once the floater is no longer immersed.

This process corresponds to weak flushing the volume of which is set by the adjustable position of the floater (32) on the tube (25).

Figure 3:
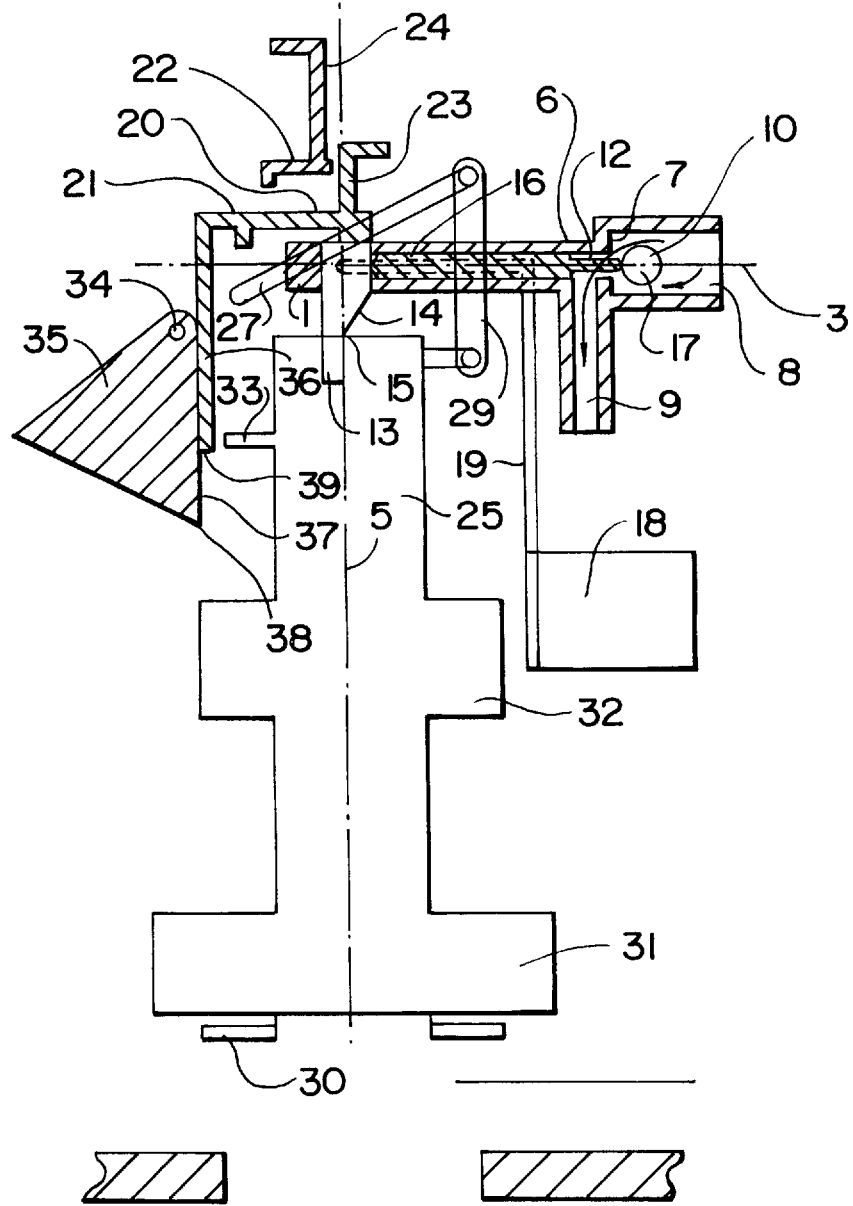

As depicted in FIG. 3, when the flush is triggered by the user by means of the rod (23), the element (35) retracts by the action of the rod (36) to allow free upward movement of the tube (25) which, being subjected to the accumulated thrust of the floaters (31) and (32), rises to the level which corresponds to a situation in which the valve (30) is outside the suction area.

The tube (25) is thus held in suspension until the floater (31) action is complete, this process corresponds to heavy flushing.

Figure 4:
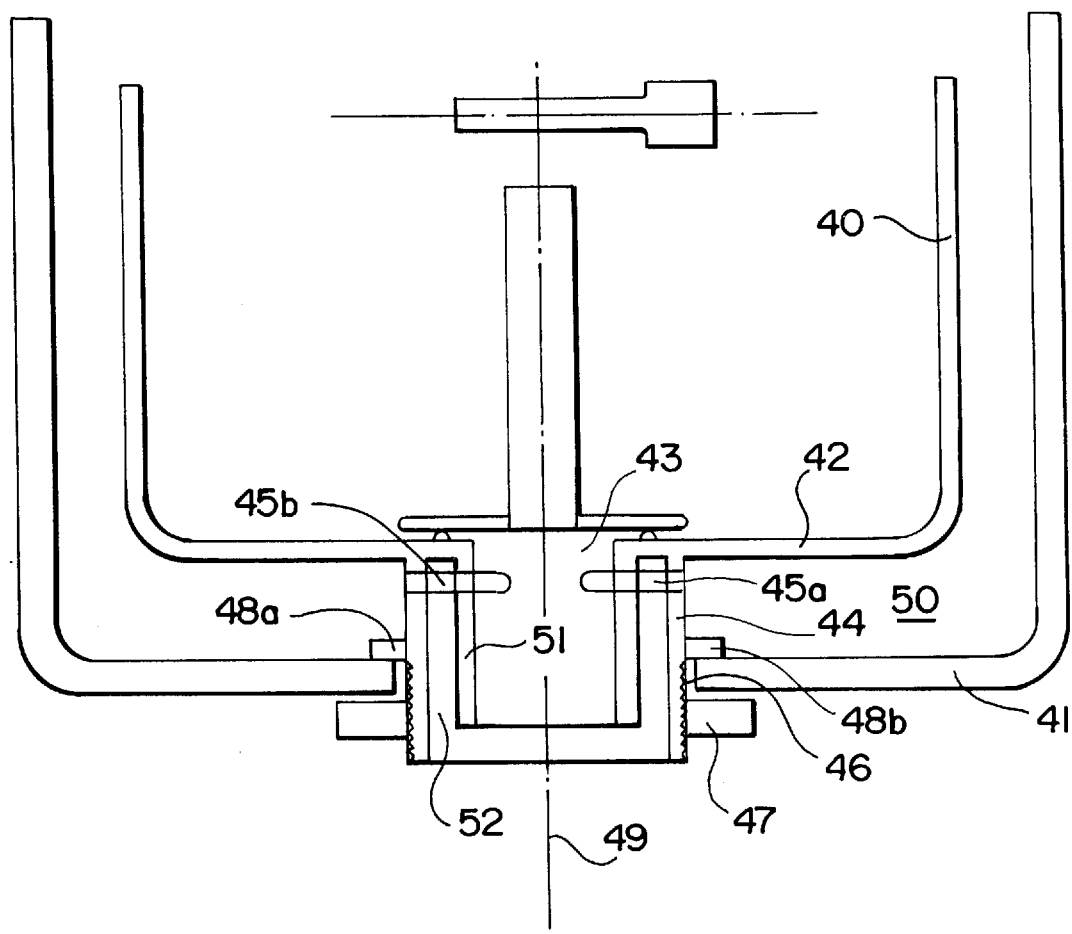
FIG. 4 shows the flush valve and mechanism unit mounted in an inner tank with its overflow device.

In FIG. 4, the flush valve and mechanism unit is housed in a tank (40) with a overall parallelepiped shape, which is in turn housed in the lavatory cistern (41).

The tank (40) comprises a round hole (43) arranged at the centre of its horizontal bottom (42).

On the underside of the bottom (42) a cylindrical element (44) is secured whose axis (49) coincides with that of the hole (43) and whose diameter is slightly greater than that of the former.

The element (44) comprises at its upper portion a series of horizontal slots (45a), (45b) and at its lower portion, a threaded portion.

The said element (44) passes through the hole (46) in the cistern (41) with which it is made rigid by means of a nut (47), shoulders (48a) and (48b) arranging a set space (50) between the outside of the tank (40) aid the inside of the cistern (41).

The hole (43) is provided—in a permanent manner—on its inner circumference with a downward-directed cylindrical element (51).

In the event of tank overflow (40), the excess water runs into the bowl through the slots (45), passing through the cylindrical space (52) which has been set between the concentric elements (44) and (51), the latter's function during flushing being to guide the flow by preventing the water from being driven back into the space (50).

I claim:

1. A flushing device adapted to be mounted within a lavatory cistern, comprising
   (i) a filling system for filling a lavatory cistern comprising a cistern inlet valve and a hydraulic closure means;
   (ii) an emptying mechanism for partially or completely draining said lavatory cistern of water stored therein;
   (iii) control means for simultaneously operating both said cistern inlet valve and said emptying mechanism;
   (i)(a) a body having a horizontal axis,
   (i)(b) an inlet adapted to be connected to a supply of water under pressure,
   (i)(c) a horizontal valve slidably mounted within said body from an open to a closed position in which the closed position does not permit water to pass from said inlet into said cistern, and the open position permits water to pass from said inlet into said cistern,
   wherein said hydraulic closure means comprises first floatation means adapted to float at the surface of water in said cistern and operatively connected to said cistern inlet valve such that said horizontal valve is urged into said closed position when said floatation means rises to a predetermined point at which the cistern is substantially full of water;
   wherein said emptying mechanism for partially or completely draining said lavatory cistern further comprises:
   (ii)(a) a cistern drain valve having a completely open, partially open and fully closed position, in which the fully closed position does not permit water stored in said cistern to drain therefrom, the completely open position permits substantially all of said stored water to drain from said cistern; and said partially open position permits only a portion of said stored water to drain from said cistern;
   (ii)(b) releasable means for locking said cistern drain valve such that it can open only to said partially open position and not to said completely open position;
   wherein said control means for simultaneously operating both said cistern inlet valve and said emptying mechanism includes separate controls for selecting a weak flush or a heavy flush such that
   (iii)(a) operating either of said separate controls causes said horizontal valve to slide from said closed position to said open position;
   (iii)(b) operating said separate control for selecting a weak flush also causes said cistern drain valve to open but does not release said releasable locking means, thereby causing said cistern drain valve to open to its partially open position and permitting only a partial draining of water stored in said cistern;
   (iii)(c) operating said separate control for selecting a heavy flush causes said cistern drain valve to open and releases said locking means, thereby causing said cistern drain valve to open to its completely open position and permitting a substantially complete draining of water stored in said cistern.

2. The flushing device of claim 1, wherein said horizontal valve is urged to slide from its closed position to an open position by movement of a cam operatively connected to said control means.

3. The flushing device of claim 2, wherein said cam is slidably mounted in a pipe having a major vertical axis inside said cistern inlet valve such that the cam has an upper "closed" position and a lower "open" position, and wherein said cam is operatively connected to said first floatation means such that said cam is urged into said upper, closed position when said first floatation means rises to predetermined point at which the cistern is substantially full of water.

4. The flushing device of claim 3, wherein said first floatation means is rigidly connected to said cam.

5. The flushing device of claim 2, wherein said horizontal valve further comprises a first end in contact with said cam and, opposite thereto, a second end which carries a nipple which is in contact with a ball locked in a sealing tight manner against a seat.

6. The flushing device of claim 1, wherein said body of said cistern inlet valve further comprises a downwardly-directed pipe adapted to guide water into said cistern when said horizontal valve is in said open position.

7. The flushing device of claim 1, wherein said cistern drain valve is attached to a bottom of an overflow tube having a lower portion, an intermediate portion, and an upper portion, said overflow tube having a second floatation means located at its bottom portion, a third floatation means located at its intermediate portion and a projecting horizontal element located at its upper portion.

8. The flushing device of claim 7, wherein said releasable locking means comprises a locking element having a lower surface and pivotally mounted about a horizontal axis in a normal locked position, such that
   (a) in the normal locked position, said lower surface is located in a vertical lifting space of said projecting horizontal element of said overflow tube, such that upward movement of said overflow tube will be arrested by contact of said projecting horizontal element with said lower surface of said locking element, and
   (b) in an unlocked position, the locking element is pivoted about said horizontal axis such that its lower surface is located outside said vertical lifting space of said overflow tube so that upward movement of said overflow tube is not arrested by said releasable locking means.

9. The flushing device of claim 8, wherein said separate control for selecting a heavy flush is operatively connected to one end of a vertical rod, said vertical rod being in a vertical plane which is the same vertical plane as said releasable locking element and having an opposite end in contact with said releasable locking element when it is in the locked position, such that pushing said separate control for selecting a heavy flush causes said locking element to pivot away from said vertical lifting space such that said lower surface does not arrest upward movement of said overflow tube.

10. The flushing device of claim 7, wherein said second floatation means has a buoyancy such that the following criteria are satisfied:
   (a) said second floatation means does not cause lifting of said overflow tube during refilling of said cistern with water, (b) said second floatation means is sufficiently buoyant to keep said overflow tube suspended until substantially complete draining of said cistern occurs during a strong flush, (c) said second floatation means is not sufficiently buoyant to overcome suction to which said overflow tube is subjected when, during a weak flush, the level of water in said cistern drops to that at which said third floatation means is no longer immersed.

11. The flushing device of claim 7, wherein said third floatation means has a buoyancy which is sufficient to keep said overflow tube suspended above a bottom of said cistern until a level of water in said cistern is reached whereby said third floatation means is no longer immersed.

12. The flushing device of claim 1, further comprising an inner tank having a bottom with a round hole in its middle;

a first, downwardly-directed vertical cylindrical element secured to a circumference of said round hole;

a second, downwardly-directed vertical cylindrical element secured to an underside of said bottom, said second, downwardly-directed vertical cylindrical element having an axis which is common with that of said hole and said first, downwardly-directed vertical cylindrical element, such that an annular space is defined between said first and second downwardly-directed vertical cylindrical elements.

13. The flushing device of claim 12, wherein said second downwardly-directed vertical cylindrical element has an upper and a lower portion, with an least one opening in its upper portion which communicates with said annular space.

14. The flushing device of claim 13, wherein said second downwardly-directed vertical cylindrical element further comprises (a) a plurality of shoulders on said upper portion which bear on said underside of said bottom and (b) a threaded portion on said lower portion, whereby said second downwardly-directed vertical cylindrical element may be made rigid with said cistern by means of a nut.

* * * * *